(12) United States Patent
Nagato et al.

(10) Patent No.: US 11,182,650 B2
(45) Date of Patent: Nov. 23, 2021

(54) INFORMATION PROCESSING APPARATUS TO GENERATE A NEXT GENERATION IMAGE PROCESSING PROGRAM IN GENETIC PROGRAMMING, CONTROL METHOD, AND NON-TRANSITORY COMPUTER-READABLE STORAGE MEDIUM FOR STORAGE PROGRAM

(71) Applicant: FUJITSU LIMITED, Kawasaki (JP)

(72) Inventors: Tsuyoshi Nagato, Isehara (JP); Hiroaki Okamoto, Atsugi (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 16/567,408

(22) Filed: Sep. 11, 2019

(65) Prior Publication Data

US 2020/0005092 A1    Jan. 2, 2020

Related U.S. Application Data

(63) Continuation of application No. PCT/JP2017/012020, filed on Mar. 24, 2017.

(51) Int. Cl.
*G06K 9/00* (2006.01)
*G06K 9/62* (2006.01)
(Continued)

(52) U.S. Cl.
CPC ......... *G06K 9/6262* (2013.01); *G06K 9/4609* (2013.01); *G06K 9/6229* (2013.01); *G06N 3/126* (2013.01)

(58) Field of Classification Search
CPC .. G06K 9/6262; G06K 9/6229; G06K 9/4609; G06N 3/126
(Continued)

(56) References Cited

U.S. PATENT DOCUMENTS

2016/0098615 A1* 4/2016 Nagato .................. G06N 3/126
382/141
2017/0287217 A1* 10/2017 Kim ..................... G02B 27/017

FOREIGN PATENT DOCUMENTS

JP    2002-366929    12/2002
JP    2004-241943    8/2004
(Continued)

OTHER PUBLICATIONS

S. Aoki et al., "ACTIT: Automatic Construction of Tree-structural Image Transformations", Journal of Information Media Society, vol. 53, No. 6, pp. 888-894, Jun. 20, 1999.
(Continued)

*Primary Examiner* — Andrew M Moyer
(74) *Attorney, Agent, or Firm* — Staas & Halsey, LLP (57) ABSTRACT

An information processing apparatus is configured to execute generation processing for generating candidates of second image processing program based on an image processing program, the second image processing program being a next generation image processing program in genetic programming, (b): execute first evaluation processing for evaluating fitness of the candidates of the second image processing program by using low-resolution learning data including an input image and a target processing result, the low-resolution learning data being obtained by reducing the resolution of at least the input image, (c): execute second evaluation processing for narrowing down the candidates of the second image processing program based on an evaluation result in the first evaluation processing, and evaluating the fitness of the narrowed-down candidates by using the learning data, and (d): execute determination processing for determining the second image processing program based on an evaluation result in the second evaluation processing.

6 Claims, 8 Drawing Sheets

(51) Int. Cl.
*G06K 9/46* (2006.01)
*G06N 3/12* (2006.01)

(58) Field of Classification Search
USPC .................................................. 382/155–161
See application file for complete search history.

(56) References Cited

FOREIGN PATENT DOCUMENTS

| | | | |
|---|---|---|---|
| JP | 2004241943 A | * | 8/2004 |
| JP | 2008-299687 | | 12/2008 |
| JP | 2009-122939 | | 6/2009 |
| JP | 2009-282579 | | 12/2009 |
| JP | 2009282579 A | * | 12/2009 |
| JP | 2011-179874 | | 9/2011 |
| WO | WO-2015001967 A1 | * | 1/2015 |

OTHER PUBLICATIONS

International Search Report dated Jun. 13, 2017 in corresponding International Patent Application No. PCT/JP2017/012020.
Written Opinion of the International Search Authority dated Jun. 13, 2017 in corresponding International Patent Application No. PCT/JP2017/012020.
Notice of Reasons for Refusal dated May 19, 2020, in corresponding Japanese Patent Application No. 2019-506890.

* cited by examiner

INFORMATION PROCESSING APPARATUS TO GENERATE A NEXT GENERATION IMAGE PROCESSING PROGRAM IN GENETIC PROGRAMMING, CONTROL METHOD, AND NON-TRANSITORY COMPUTER-READABLE STORAGE MEDIUM FOR STORAGE PROGRAM

CROSS-REFERENCE TO RELATED APPLICATION

This application is a continuation application of International Application PCT/JP2017/012020 filed on Mar. 24, 2017 and designated the U.S., the entire contents of which are incorporated herein by reference.

FIELD

The embodiments discussed herein are related to an information processing apparatus, a control method implemented by an information processing method, and a non-transitory computer-readable storage medium storing a program.

BACKGROUND

In the appearance inspection and the like of industrial products, the appearance of the industrial products is imaged by using an imaging apparatus to determine the presence or absence of a defect. Here, in the factory automation (FA) field, noise, shadows, brightness fluctuations, and the like depending on the imaging environment of a site often affect the captured image, and it is desirable to realize processing that is robust to environmental changes in an image processing program that extracts a defective portion. Also, in the case of using an appearance inspection apparatus to inspect the appearance of industrial products, when the inspection environment changes due to the change of an inspection target or the improvement of the appearance inspection apparatus, the image processing program may be reconstructed. Therefore, in the appearance inspection apparatus, it is desired that an image processing method is easily constructed.

An image processing apparatus used in the appearance inspection apparatus obtains an output image by performing image processing on an image captured by a camera or the like with an image processing filter. Here, in the image processing apparatus of the related art, a technique is known in which an image processing filter is automatically generated by performing evolutionary calculation based on genetic programming (GP). In this technique, an individual indicating an image processing program is represented by a tree structure having one or more nodes each corresponding to a program element (image processing filter) of image processing, a child individual is generated based on a parent individual of a certain generation, and image processing based on the child individual is performed by using an input image given as learning data. Then, the fitness of the child individual is calculated by comparing the processing result with the target processing result (for example, the target image) given as the learning data. In addition, the image processing program is optimized by selecting an individual to be replaced at the time of generation change based on the fitness (see, for example, Shinya Aoki, Tomoharu Nagao, "ACTIT: Automatic Construction of Tree-structural Image Transformations", Journal of Information Media Society Vol. 53, No. 6, Jun. 20, 1999, p. 888-894).

SUMMARY

According to an aspect of the embodiments, provided is an information processing apparatus configured to perform image processing on an image captured by an imaging apparatus. The information processing apparatus includes: a memory; and a processor coupled to the memory, the processor being configured to (a): execute generation processing that includes generating candidates of second image processing program based on an image processing program, the image processing program being a program having a tree structure, and the second image processing program being a next generation image processing program in genetic programming, (b): execute first evaluation processing that includes evaluating fitness of the candidates of the second image processing program by using low-resolution learning data, the low-resolution learning data being learning data including an input image and a target processing result, and being the learning data obtained by reducing the resolution of at least the input image, (c): execute second evaluation processing that includes narrowing down the candidates of the second image processing program based on an evaluation result in the first evaluation processing, and evaluating the fitness of the narrowed-down candidates of the second image processing program by using the learning data, and (d): execute determination processing that includes determining the second image processing program based on an evaluation result in the second evaluation processing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the process of generating an image processing program using genetic programming, the fitness of a child individual is calculated at each generational change. Here, many generation changes are made to finally obtain a high-performance image processing program, but the greater the number of generational changes, the longer the overall time taken to calculate the fitness. Also, as the tree structure of the individual becomes more complex in order to generate a high-performance image processing program, the image processing based on the tree structure also becomes complex, and the time to calculate the fitness of each child individual becomes longer accordingly. Further, the program element (image processing filter) of the image processing may be a spatial filter, and when the size of a target image becomes large, the calculation time of the fitness becomes longer. As described above, when the time taken to calculate the fitness increases, the time until an optimal individual is obtained increases.

In one aspect, the embodiments aim to provide an information processing apparatus, an information processing method, and a recording medium capable of shortening the time to determine a next-generation image processing filter using genetic programming.

First Embodiment

Hereinafter, a first embodiment of an information processing apparatus will be described in detail based on FIGS. 1 to 4.

First, an outline of generation processing of an image processing program using genetic programming will be described based on FIG. 1.

Outline of Image Processing Program Generation Processing

Figure 1:
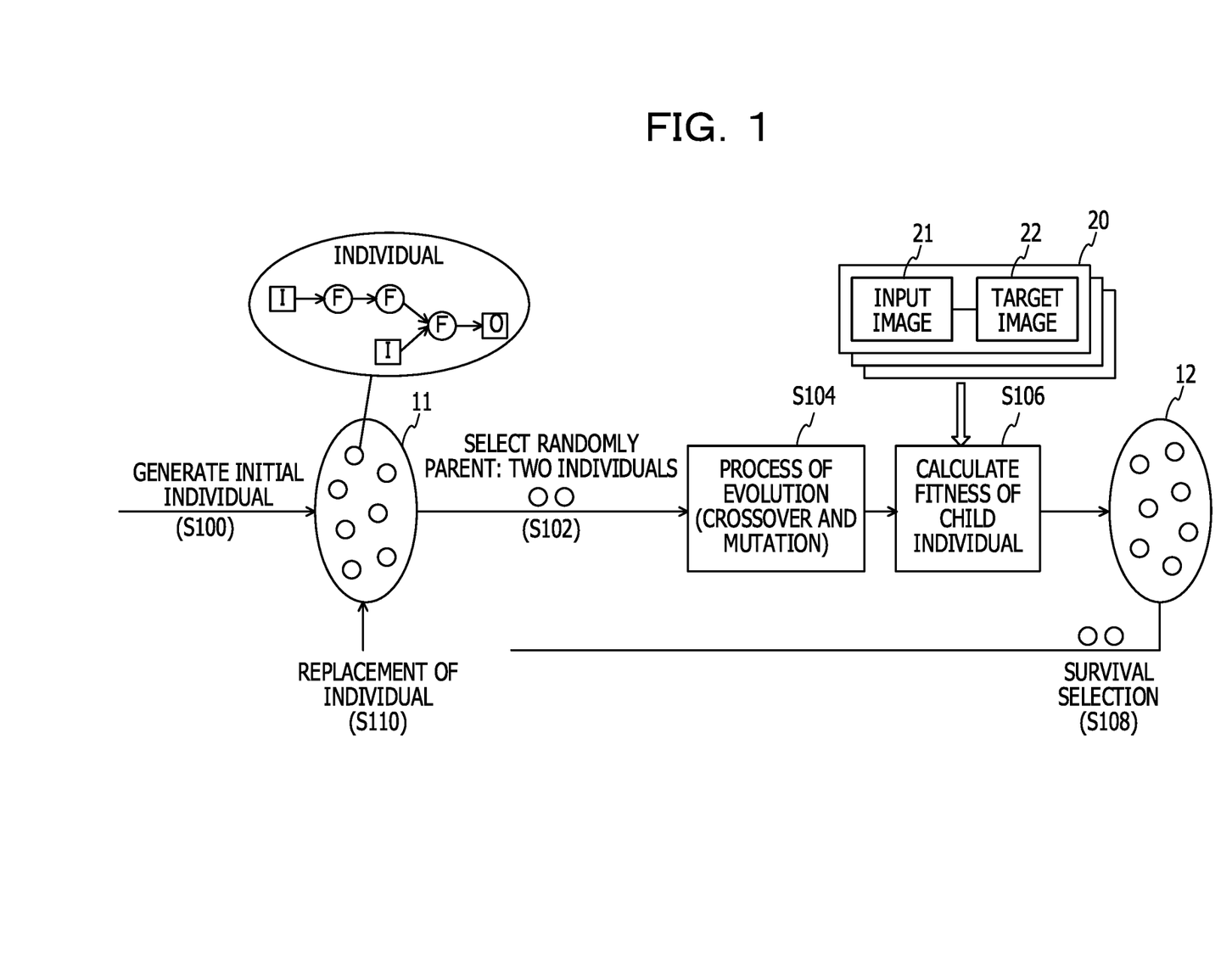
FIG. 1 is a diagram illustrating an outline of image processing program generation processing according to a first embodiment.

FIG. 1 is a diagram illustrating an outline of a generation processing procedure of an image processing program. As a premise, at least one learning data 20 is prepared before the image processing program generation processing. The learning data 20 includes input image 21 and a processing result (a target image 22 in the first embodiment) when image processing is performed on the input image 21. The input image 21 is obtained, for example, by imaging a subject with a camera.

In the process of generating an image processing program using genetic programming, an individual (indicated by a white circle in FIG. 1) is configured by combining one or more image processing filters. For example, as illustrated in the upper left of FIG. 1, an individual is defined by a tree structure, and an image processing filter is incorporated in each node of the tree structure. In the upper left of FIG. 1, "F" indicates an image processing filter incorporated in a node, "I" indicates an input terminal, and "O" indicates an output terminal. In addition, a plurality of image processing filters that may be incorporated into an individual are also prepared in advance.

The generation processing of the image processing program using genetic programming is performed, for example, as follows.

First, in step S100, a plurality of initial individuals included in a population 11 are generated. The node of each initial individual incorporates an image processing filter randomly selected from the plurality of image processing filters prepared in advance. Also, the fitness is calculated for each of the generated initial individuals. Details of the fitness calculation processing will be described later.

Next, in step S102, a fixed number (for example, two in FIG. 1) of parent individuals are randomly selected from the population 11. Next, in step S104, processing is performed on the selected fixed number (two) of the parent individuals in the process of evolution to generate a fixed number of two or more child individuals. In the process of evolution, crossover and mutation are performed on the two parent individuals. Three or more child individuals may be generated by performing different crossover and mutation on the two parent individuals. That is, the number of child individuals generated is equal to or more than the number of parent individuals selected from the population 11.

Next, in step S106, the fitness is calculated for each of the generated child individuals. Details of the calculation processing of the fitness will be described later.

Here, in a case where the fitness of any of the generated child individuals and the original parent individuals is equal to or higher than a predetermined threshold, the individual is output as a final image processing program, and the program generation processing ends.

On the other hand, in a case where the fitness of all these individuals is less than the predetermined threshold, in step S108, survival selection is performed from the population 12 including each of the generated child individuals and the original two parent individuals. In this survival selection, an individual with the highest calculated fitness is selected from the population 12. Further, from the remaining individuals in the population 12, one individual is selected by a predetermined method. For example, an individual is selected with a probability according to the fitness from among the remaining individuals (roulette selection).

Two individuals selected by such survival selection are replaced with two individuals selected as parent individuals among the individuals included in population 11 in step S110. Thereby, the individuals included in the population 11 are changed as next-generation individuals. Then, the same processing is repeated until an individual whose fitness is equal to or higher than a predetermined threshold appears.

As an application of the image processing program generated by the above-described procedure, for example, in the field of factory automation (FA), it is conceivable that image processing is performed on an image obtained by capturing a product to obtain a desired effect. For example, it is possible to perform image processing on an image obtained by capturing the appearance of the product to extract a location where a defect has occurred and to extract a location to be aligned.

In such applications, there may be a case of reconstructing the image processing program in response to changes or improvements in the product to be the subject, or a change in the imaging environment associated therewith. For this reason, simple construction of the image processing program has been desired. In addition, it is desired to construct an image processing program that is highly robust to changes in imaging environment such as changes in illumination conditions, shapes of subjects, and variations in position and orientation.

When using genetic programming, it is possible to easily generate an image processing program usable for such an application only by preparing the input image 21 and the target image 22 corresponding the input image 21 in advance. It is also possible to automatically generate an image processing program that is highly robust to changes in the imaging environment by preparing a plurality of pairs of input image 21 and target image 22 (learning data 20) each having a different imaging environment.

Configuration of Image Processing Apparatus

Next, the configuration and the like of an image processing apparatus 100 as an information processing apparatus for performing the above-described image processing program generation processing will be described based on FIG. 2. An example of the hardware configuration of the image processing apparatus 100 is schematically illustrated in FIG. 2.

Figure 2:
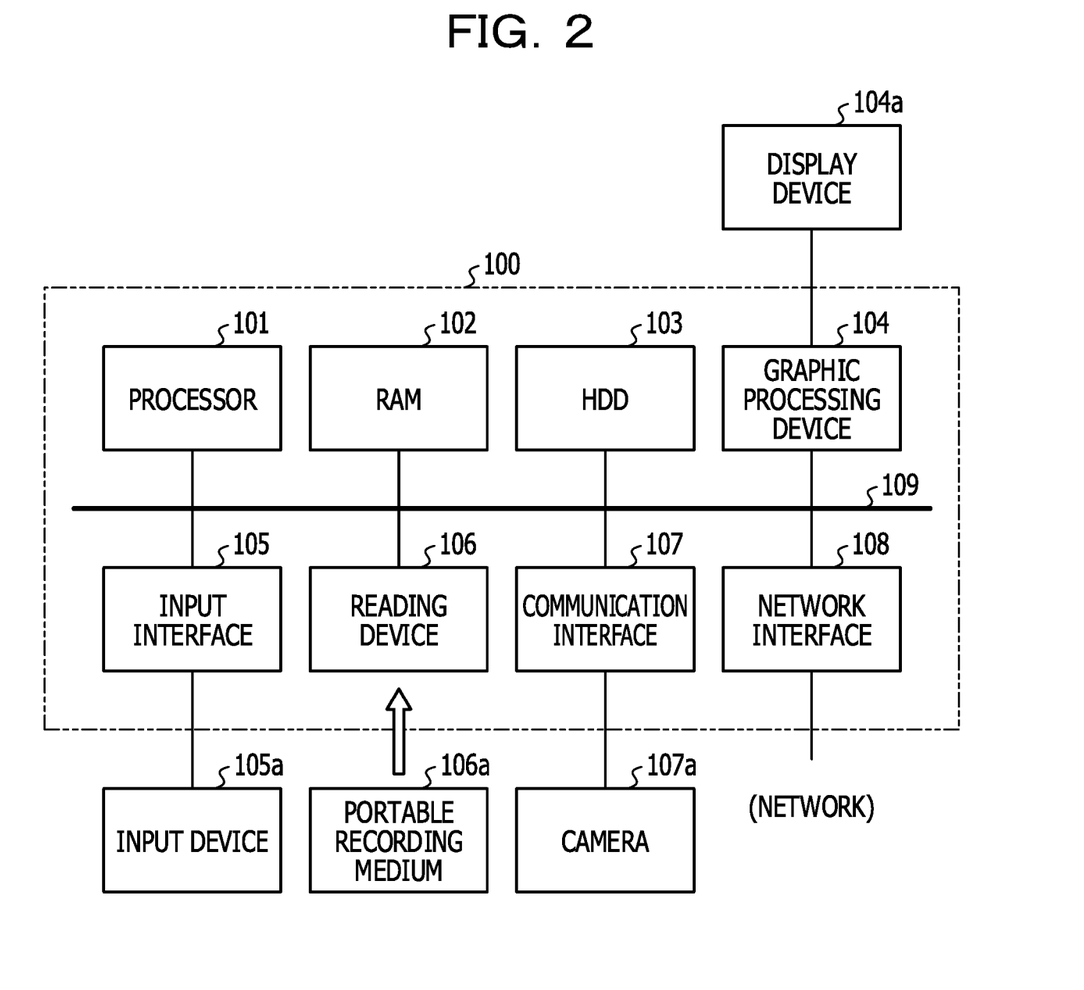
FIG. 2 is a diagram illustrating a hardware configuration of an image processing apparatus.

The image processing apparatus 100 according to the first embodiment is realized, for example, as a computer (information processing apparatus) as illustrated in FIG. 2.

The image processing apparatus 100 is controlled by a processor 101 as a whole. The processor 101 may be a multiprocessor. The processor 101 is, for example, a central processing unit (CPU), a micro processing unit (MPU), a digital signal processor (DSP), an application specific integrated circuit (ASIC), a programmable logic device (PLD), or the like. Also, the processor 101 may be a combination of two or more elements of a CPU, an MPU, a DSP, an ASIC, and a PLD. A RAM 102 and a plurality of devices (peripheral devices) are coupled to the processor 101 via a bus 109.

The RAM 102 is used as a main storage device of the image processing apparatus 100. The RAM 102 temporarily stores at least a part of an operating system (OS) program and application programs to be executed by the processor 101. The RAM 102 also stores various data for processing by the processor 101.

The devices coupled to the bus 109 include a hard disk drive (HDD) 103, a graphic processing device 104, an input interface 105, a reading device 106, a communication interface 107, a network interface 108, and the like.

The HDD 103 is used as an auxiliary storage device of the image processing apparatus 100. The HDD 103 stores an OS program, an application program, and various data. As the auxiliary storage device, another type of non-volatile storage device such as a solid state drive (SSD) may also be used.

A display device 104a is coupled to the graphic processing device 104. The graphic processing device 104 displays an image on the screen of the display device 104a in accordance with an instruction from the processor 101. Examples of the display device 104a include a liquid crystal display and an organic electroluminescence (EL) display.

An input device 105a is coupled to the input interface 105. The input interface 105 transmits the signal output from the input device 105a to the processor 101. The input device 105a includes a keyboard, a pointing device, and the like. Examples of pointing devices include a mouse, a touch panel, a tablet, a touch pad, and a trackball.

A portable recording medium 106a is removable from the reading device 106. The reading device 106 reads the data recorded on the portable recording medium 106a and transmits the data to the processor 101. The portable recording medium 106a includes an optical disc, a magneto-optical disc, a semiconductor memory, and the like.

The communication interface 107 transmits and receives data to and from coupled external devices. In the first embodiment, a camera 107a as an imaging apparatus is coupled to the communication interface 107, and the communication interface 107 transmits image data transmitted from the camera 107a to the processor 101.

The network interface 108 exchanges data with other devices via the network.

Processing Function Provided to Image Processing Apparatus 100

Figure 3:
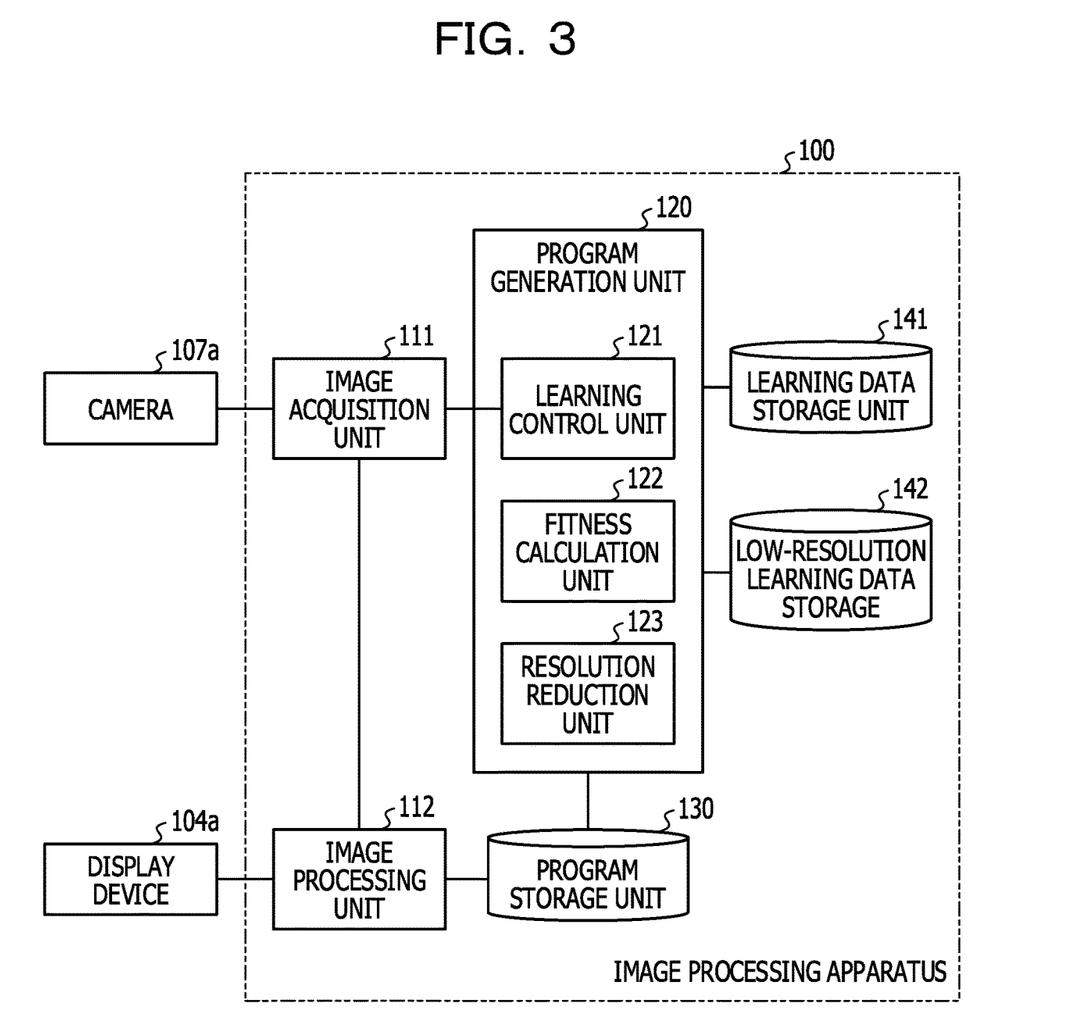
FIG. 3 is a functional block diagram of the image processing apparatus.

FIG. 3 is a block diagram (functional block diagram) illustrating an exemplary configuration of processing functions provided in the image processing apparatus. The image processing apparatus 100 includes an image acquisition unit 111, an image processing unit 112, a program generation unit 120, a program storage unit 130, a learning data storage unit 141, and a low-resolution learning data storage unit 142. The processes of the image acquisition unit 111, the image processing unit 112, and the program generation unit 120 are realized, for example, by the processor 101 of the image processing apparatus 100 executing a predetermined program. Further, a part of the processing of the image processing unit 112 is realized by the processor 101 of the image processing apparatus 100 executing the image processing program stored in the program storage unit 130. The program storage unit 130, the learning data storage unit 141, and the low-resolution learning data storage unit 142 are realized, for example, as a storage area of the HDD 103 of the image processing apparatus 100.

The image acquisition unit 111 acquires data of an image captured by the camera 107a from the camera 107a and outputs the data to the program generation unit 120 or the image processing unit 112.

The program generation unit 120 generates an image processing program using genetic programming and stores the generated image processing program in the program storage unit 130. Details of the program generation unit 120 will be described later.

The image processing unit 112 acquires data of an image captured by the camera 107a via the image acquisition unit 111. The image processing unit 112 performs image processing on the acquired image in accordance with the image processing program stored in the program storage unit 130. The image after processing is displayed over the display device 104a, for example.

The program storage unit 130 stores the image processing program generated by the program generation unit 120.

The learning data storage unit 141 stores one or more pieces of learning data including each data of the input image and the target image. The input image included in the learning data may be, for example, an image captured by the camera 107a coupled to the image processing apparatus 100.

In the first embodiment, as an example, an image is output as a result of processing using the generated image processing program, but information other than the image may be output as a result of the processing. As a result of such processing, for example, position information indicating a region in the input image, a classification result or an evaluation result of the input image, and the like may be considered. As described above, in a case where the processing result is not an image, the learning data may include information other than the image indicating the target processing result instead of the target image.

The low-resolution learning data storage unit 142 stores one or more pieces of data (low-resolution learning data) obtained by reducing the resolution of each data of the input image and the target image of the learning data stored in the learning data storage unit 141.

The program generation unit 120 includes a learning control unit 121 as a generation unit, and a determination unit, a fitness calculation unit 122 as a first evaluation unit and a second evaluation unit, and a resolution reduction unit 123 as a creation unit.

The learning control unit 121 centrally controls the entire program generation processing in the program generation unit 120. For example, the learning control unit 121 executes processing such as generation of an initial individual to be included in the population 11 (S100), processing of the individual in the process of evolution (S104), survival selection based on fitness (S108), output of the final image processing program, and update of the population 11 by the individuals selected by survival selection (S110) illustrated in FIG. 1.

The fitness calculation unit 122 calculates the fitness for evaluating an individual. Specifically, the fitness calculation unit 122 selectively uses learning data stored in the learning data storage unit 141 and low-resolution learning data stored in the low-resolution learning data storage unit 142 according to the situation to calculate the fitness of each image processing program. For example, in the case of using low-resolution learning data, the fitness calculation unit 122 performs image processing on the input image included in the low-resolution learning data in accordance with the image processing program to calculate the similarity between the obtained image and the target image corresponding to the image-processed input image as the fitness of the individual. Also, in the case of using learning data, the fitness calculation unit 122 performs image processing on the input image included in the learning data in accordance with the image processing program to calculate the similarity between the obtained image and the target image corresponding to the image-processed input image as the fitness of the individual.

The resolution reduction unit 123 acquires learning data stored in the learning data storage unit 141 to reduce the input image and the target image included in the learning data at a predetermined reduction ratio s. In the first embodiment, it is assumed that the reduction ratio s is predetermined.

Processing of Image Processing Apparatus 100

Figure 4A:
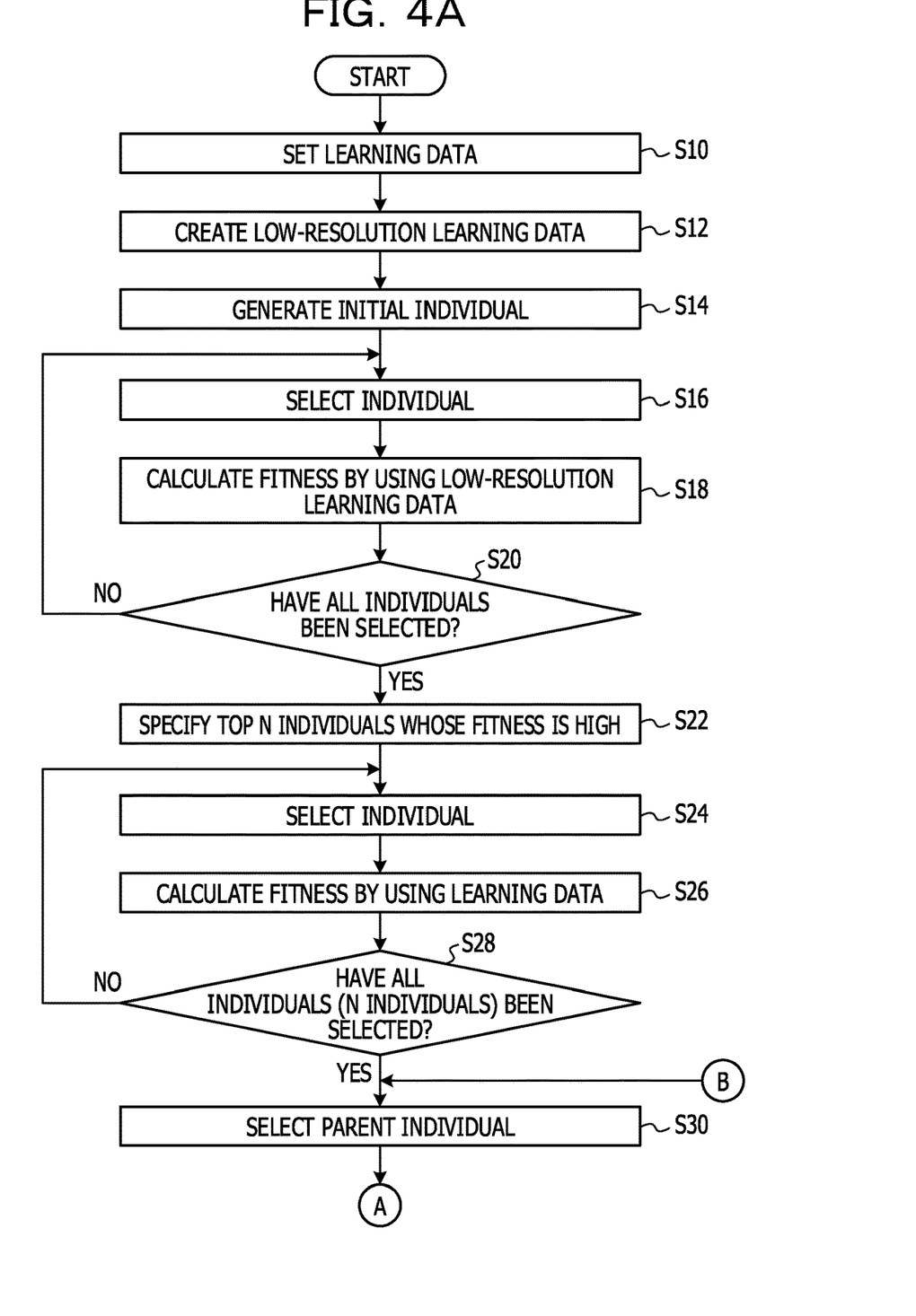
FIGS. 4A and 4B are flowcharts illustrating processing of the image processing apparatus according to the first embodiment.
Figure 4B:
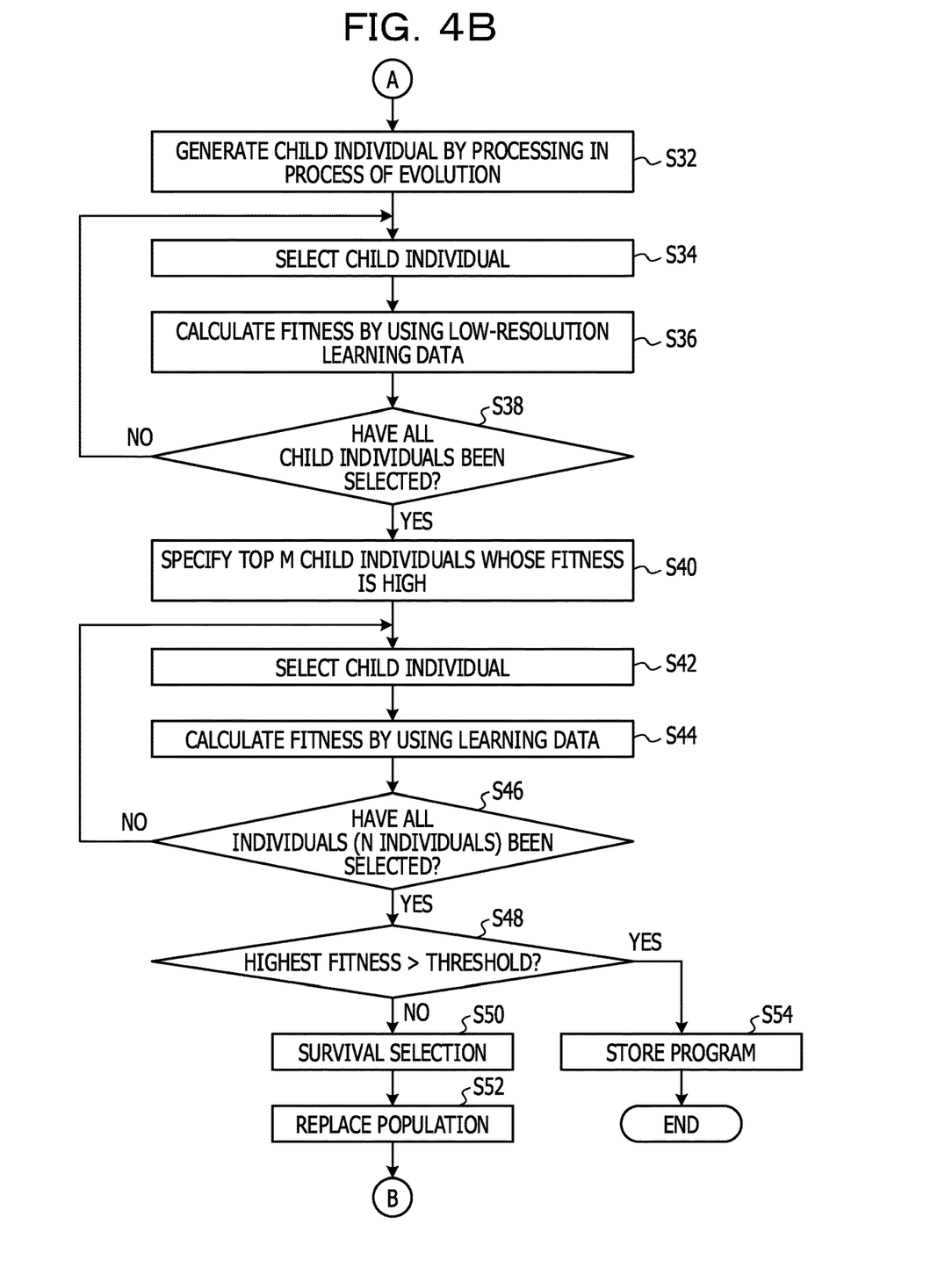

FIGS. 4A and 4B are flowcharts illustrating details of the program generation processing executed by the image processing apparatus 100.

In step S10 of FIG. 4A, the learning control unit 121 receives an input operation for setting learning data. For example, the learning data to be used in the present processing is specified from among the learning data stored in the learning data storage unit 141. Alternatively, the learning data to be used in the present processing is registered in the learning data storage unit 141.

Next, in step S12, the resolution reduction unit 123 acquires learning data from the learning data storage unit 141 and reduces the resolution of the acquired learning data to create low-resolution learning data. In the first embodiment, the resolution reduction unit 123 reduces the resolution of the input image and the target image included in the learning data using the reduction ratio s determined in advance. The resolution reduction unit 123 stores learning data (low-resolution learning data) which is reduced in resolution in the low-resolution learning data storage unit 142. Hereinafter, the input low-resolution image and the target image are referred to as "low-resolution input image" and "low-resolution target image".

Next, in step S14, the learning control unit 121 generates a predetermined number of initial individuals included in the population 11 (see step S100 in FIG. 1). Each initial individual is generated by randomly selecting and combining image processing filters for each node of the tree structure. Also, the tree structure of each initial individual is, for example, randomly selected from among a plurality of predetermined tree structures. Alternatively, the tree structure itself may be determined randomly.

Next, in step S16, the learning control unit 121 selects one individual from the population 11 and requests the fitness calculation unit 122 to calculate the fitness of the selected individual by using low-resolution learning data.

Next, in step S18, the fitness calculation unit 122 calculates (evaluates) the fitness of the individual selected in step S16 by using the low-resolution learning data. Specifically, the fitness calculation unit 122 performs image processing on the low-resolution input image included in the low-resolution learning data in accordance with the image processing program corresponding to the selected individual. At this time, the parameters of the image processing filter which is a component of the image processing program are adjusted in accordance with the reduction ratio s (for example, the kernel diameter of the spatial filter is reduced in accordance with the reduction ratio s). The fitness calculation unit 122 calculates the similarity between the image obtained by the image processing and the low-resolution target image associated with the low-resolution input image as the fitness of the selected individual. In a case where a plurality of pieces of low-resolution learning data are registered, for example, the fitness calculation unit 122 calculates the similarity by using each low-resolution learning data and sets the average value of the similarity as the fitness of the individual.

Next, in step S20, the learning control unit 121 determines whether or not all the individuals included in the population 11 have been selected. In a case where the determination in step S20 is negative, that is, in a case where there is an unselected individual, the learning control unit 121 returns to step S16 and selects the next individual. On the other hand, in a case where the determination in step S20 is positive, that is, in a case where all the individuals have been selected, the learning control unit 121 proceeds to step S22.

When calculation of the fitness using low-resolution learning data is performed for all individuals and the process proceeds to step S22, the learning control unit 121 specifies (narrows down) the top N individuals whose fitness is high. Here, the value of N is assumed to be set in advance.

Next, in step S24, the learning control unit 121 selects any one of the N specified individuals and requests the fitness calculation unit 122 to calculate the fitness of the selected individual by using the learning data.

Next, in step S26, the fitness calculation unit 122 calculates (evaluates) the fitness of the individual selected in step S24 by using learning data. Specifically, the fitness calculation unit 122 performs image processing on the input image included in the learning data in accordance with the image processing program corresponding to the selected individual. The fitness calculation unit 122 calculates the similarity between the image obtained by image processing and the target image associated with the input image as the fitness of the selected individual. In a case where a plurality of pieces of learning data are registered, the fitness calculation unit 122 calculates the similarity by using, for example, each learning data and sets the average value of the similarity as the fitness of the individual.

Next, in step S28, the learning control unit 121 determines whether or not all of the N individuals have been selected. In a case where the determination in step S28 is negative, that is, in a case where there is an unselected individual, the learning control unit 121 returns to step S24 and selects the next individual. On the other hand, in a case where the determination in step S28 is positive, that is, in a case where all N individuals have been selected, the learning control unit 121 proceeds to step S30.

When the fitness of all N individuals is calculated and the process proceeds to step S30, the learning control unit 121 randomly selects two parent individuals from among the individuals included in the population 11 (see step S102 in FIG. 1).

Next, in step S32 of FIG. 4B, the learning control unit 121 generates a child individual by the processing in the process of evolution (see step S104 in FIG. 1). In this case, the learning control unit 121 performs crossover between the two selected parent individuals to generate a predetermined number of two or more child individuals. Further, the learning control unit 121 generates a mutation at any node of the generated child individuals and replaces the image processing filter incorporated in the node of the original child individual with another image processing filter.

Next, in step S34, the learning control unit 121 selects one of the child individuals and requests the fitness calculation unit 122 to calculate the fitness of the selected individual by using the low-resolution learning data.

Next, in step S36, the fitness calculation unit 122 calculates (evaluates) the fitness of the individual selected in step S34 by using the low-resolution learning data. The specific processing of step S36 is the same as step S18 described above.

Next, in step S38, the learning control unit 121 determines whether or not all child individuals have been selected. In a case where the determination in step S38 is negative, that is, in a case where there is an unselected child individual, the learning control unit 121 returns to step S34 and selects the next child individual. On the other hand, in a case where the determination in step S38 is positive, that is, in a case where all child individuals have been selected, the learning control unit 121 proceeds to step S40.

When calculation of the fitness by using the low-resolution learning data is performed for all the child individuals and the process proceeds to step S40, the learning control unit 121 specifies (narrows down) the top M child individuals whose fitness is high. Here, the value of M is assumed to be set in advance and may be the same as or different from N described above.

Next, in step S42, the learning control unit 121 selects any one of the M specified child individuals and requests the fitness calculation unit 122 to calculate the fitness of the selected child by using the learning data.

Next, in step S44, the fitness calculation unit 122 calculates (evaluates) the fitness of the child individual selected in step S42 by using the learning data. The specific processing of step S44 is the same as step S26 described above.

Next, in step S46, the learning control unit 121 determines whether or not all of the M child individuals have been selected. In a case where the determination in step S46 is negative, that is, in a case where there is an unselected child individual, the learning control unit 121 returns to step S42 and selects the next child individual. On the other hand, in a case where the determination in step S46 is positive, that is, in a case where all M child individuals have been selected, the learning control unit 121 proceeds to step S48. In the first embodiment, the processing of steps S34 to S46 corresponds to step S106 of FIG. 1. In the first embodiment, as described above, the fitness calculation unit 122 carefully selects child individuals based on the result of calculating the fitness by using the low-resolution learning data to calculate the fitness only for the carefully selected child individuals by using high-resolution learning data. For this reason, it is possible to perform the calculation processing of the fitness in a short time as compared with the case where the calculation processing of the fitness using the high-resolution learning data is performed for all the child individuals.

After proceeding to step S48, the learning control unit 121 specifies the highest fitness from among the fitness of each parent individual selected in step S30 and the fitness of each child individual calculated in step S44 to determine whether or not the highest fitness is larger than a predetermined threshold. In a case where the highest fitness is larger than the threshold, the learning control unit 121 proceeds to the processing of step S54, and in a case where the highest fitness is equal to or lower than the threshold, the learning control unit 121 proceeds to the processing of step S50.

When proceeding to step S50, the learning control unit 121 selects an individual having the highest fitness from each parent individual selected in step S30 and each child individual generated in step S32 as an individual allowed to survive (see step S108 in FIG. 1). Furthermore, the learning control unit 121 selects one individual allowed to survive from among the remaining individuals. In this selection, an individual allowed to survive is selected with a probability according to the fitness of each remaining individual (roulette selection).

Next, in step S52, the learning control unit 121 replaces the parent individual selected in step S30 among the individuals included in the population 11 with the two individuals selected in step S50 (see step S110 in FIG. 1). Thus, the generation of the population 11 is updated. After that, the process returns to step S30, and the processing after step S30 is executed as described above.

On the other hand, in a case where the determination in step S48 is positive and the process proceeds to step S54, the learning control unit 121 stores the image processing program corresponding to the individual whose fitness is determined to be larger than the threshold in step S48 in the program storage unit 130 and ends the processing.

As described above in detail, according to the first embodiment, the learning control unit 121 generates a candidate (child individual) of a next-generation image processing program in genetic programming based on the image processing program (parent individual) included in the population 11 (S32). Further, the fitness calculation unit 122 calculates the fitness of the child individual by using the low-resolution learning data obtained by reducing the resolution of the learning data (S36), narrows down the child individuals (S40) based on the calculation result, and calculates the fitness of the narrowed child individuals by using the learning data (S44). Then, the learning control unit 121 determines an image processing program to be newly used based on the calculation result of the fitness calculation unit 122 and stores the image processing program in the program storage unit 130 (S54). That is, in the first embodiment, although the simple calculation processing of the fitness using the low-resolution learning data is performed for all the child individuals, child individuals are carefully selected based on the fitness calculated by the simple calculation processing, and the fitness calculation processing using high-resolution learning data is performed only on the carefully selected child individuals. Thus, as in the case of determining the image processing program to be newly used, in a case where a child individual with high fitness is desired, it is possible to perform the calculation processing of the fitness using high-resolution learning data only for some selected child individuals. Therefore, since the number of times of the calculation processing of the fitness using the high-resolution learning data may be reduced, the time for the processing by the fitness calculation unit 122 may be shortened. From an actual simulation result, it was found that the time for processing by the fitness calculation unit 122 may be shortened by 50% by setting the reduction ratio s as 0.5. Therefore, according to the first embodiment, it is possible to shorten the time for determining the image processing program to be newly used. In particular, the more complex the tree structure of the child individual, the longer the processing time of the input image using the image processing program illustrated by the tree structure, but the processing time may be shortened by applying the first embodiment. Also, in the FA field, as in the case of detecting minute defects in a larger field of view using a high-resolution camera, even if the image size of the input image is increased, the time for determining the image processing program may be within an allowable range.

In the first embodiment, also in the calculation of the fitness of the initial individual, as illustrated in steps S16 to S28, the same processing as in steps S34 to S46 is performed. As a result, the time for calculating the fitness of the initial individual may be shortened, and in this respect as well, the time for determining an image processing program to be newly used may be shortened.

Also, in the first embodiment, since the resolution reduction unit 123 reduces the resolution of the learning data, the processing of FIGS. 4A and 4B described above may be realized simply by preparing the learning data. However, not limited thereto, the resolution reduction unit 123 may be omitted from the image processing apparatus 100. In this case, the image processing apparatus 100 may obtain low-resolution learning data from the outside.

In the first embodiment, although the case where the resolution reduction unit 123 reduces the resolution of both the input image and the target image included in the learning data has been described, the embodiments are not limited thereto. That is, the resolution reduction unit 123 may reduce the resolution of at least the input image.

Second Embodiment

A second embodiment will be described below.

Figure 5A:
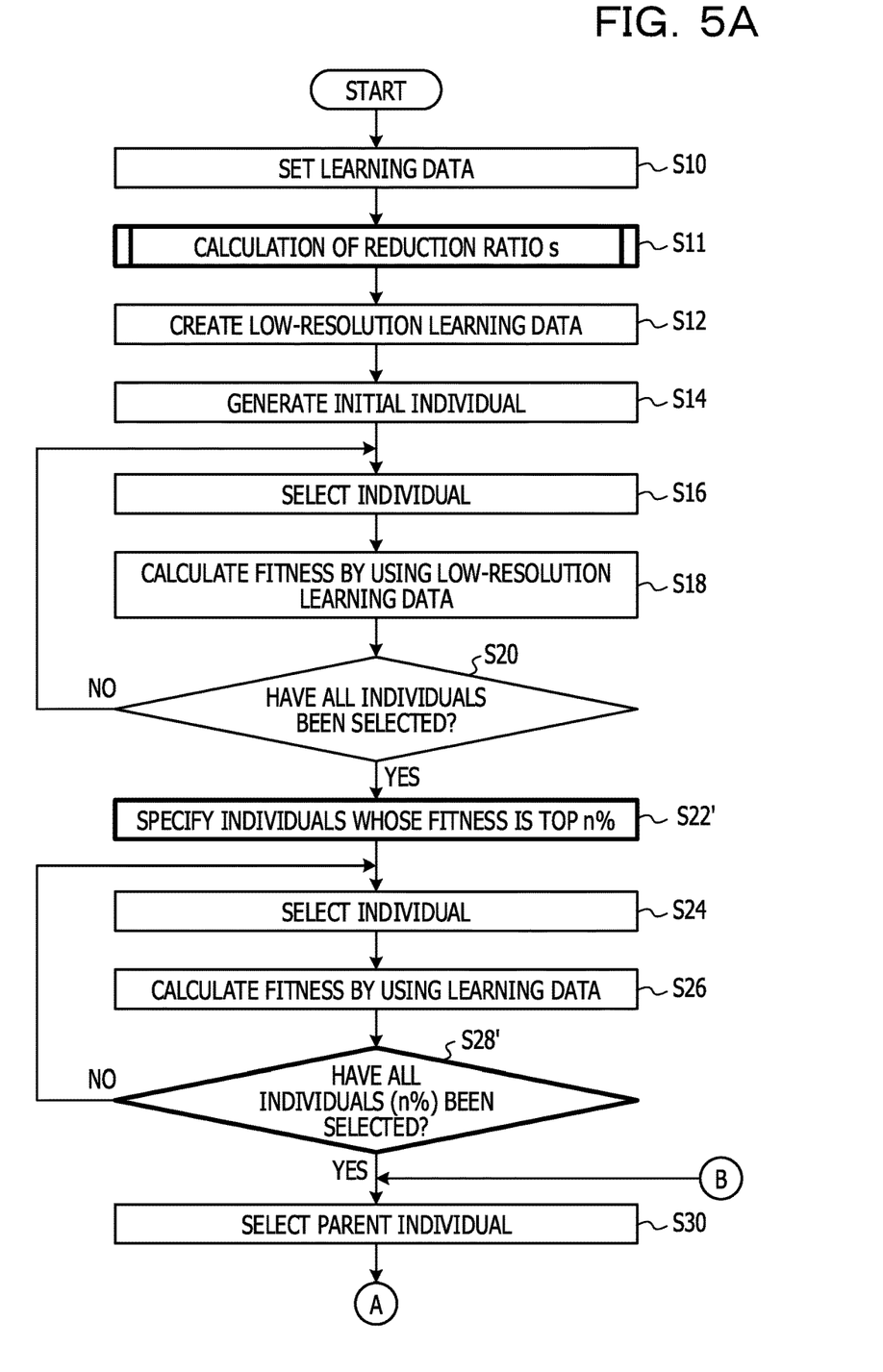
FIGS. 5A and 5B are flowcharts illustrating processing of an image processing apparatus according to a second embodiment.
Figure 5B:
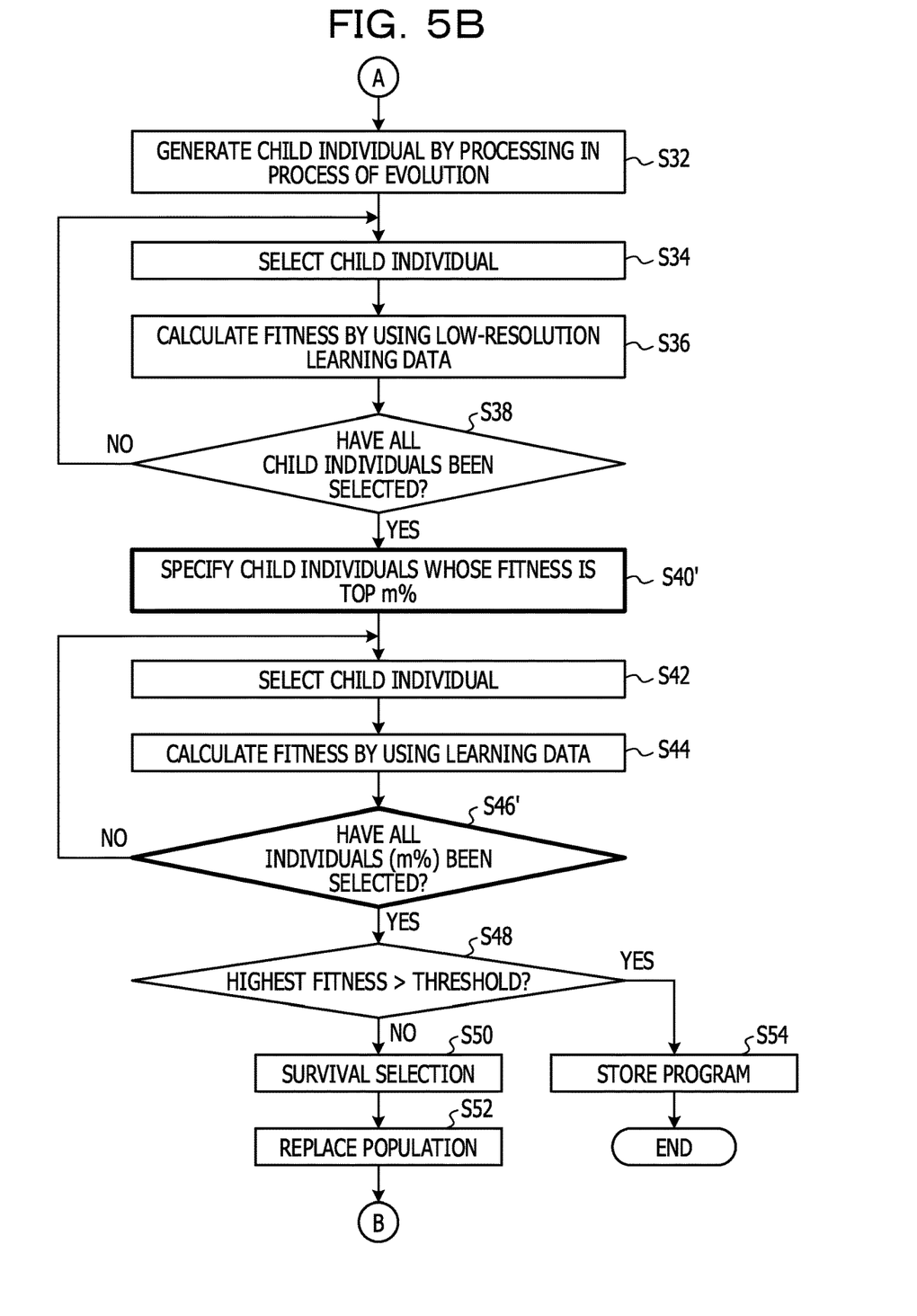

FIGS. 5A and 5B are flowcharts illustrating processing of the image processing apparatus 100 according to the second embodiment. As seen by comparing the processing of FIGS. 5A and 5B with the processing of the first embodiment (FIGS. 4A and 4B) described above, the processing (calculation processing of reduction ratio s) of step S11 is added in the second embodiment. In the second embodiment, steps S22', S28', S40', and S46' are executed instead of steps S22, S28, S40, and S46 of FIGS. 4A and 4B. Hereinafter, the second embodiment will be described focusing on parts different from the first embodiment.

Figure 6:
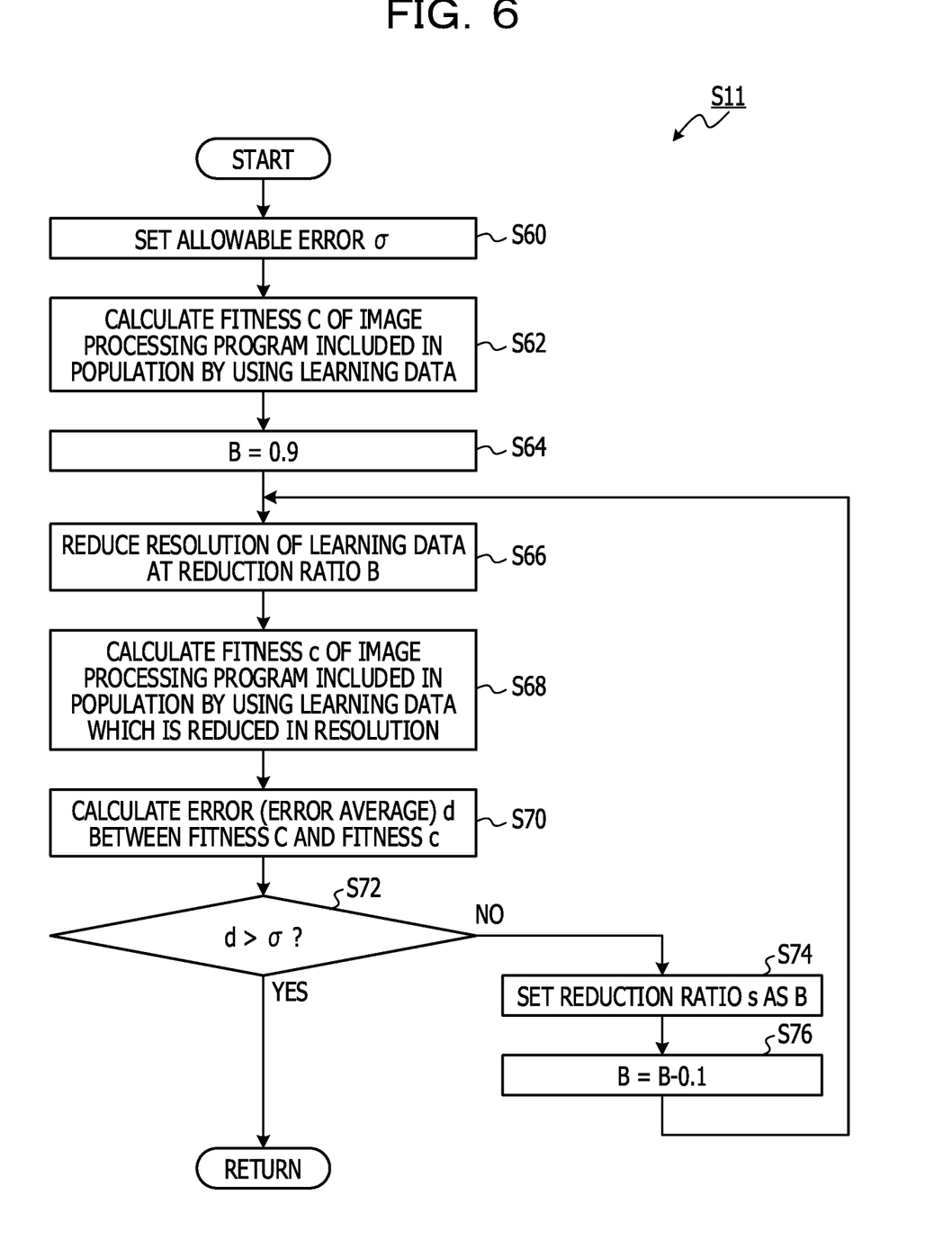
FIG. 6 is a flowchart illustrating the processing of step S11 of FIG. 5A.

In the first embodiment described above, the reduction ratio s is determined in advance, but in the second embodiment, the reduction ratio s is automatically determined by executing the processing according to the flowchart of FIG. 6 in step S11 of FIG. 5A.

In the processing of FIG. 6, first, in step S60, the learning control unit 121 sets an allowable error σ. For the allowable error σ, a value input in advance is used.

Next, in step S62, the learning control unit 121 uses the learning data to calculate a fitness C of the image processing program included in the population. When there are a plurality of pieces of learning data, the fitness C is calculated by using each learning data.

Next, in step S64, the learning control unit 121 sets a variable B to 0.9.

Next, in step S66, the resolution reduction unit 123 reduces the resolution of the learning data at the reduction ratio B. In a case where there is a plurality of pieces of learning data, the resolution of each learning data is reduced.

Next, in step S68, the learning control unit 121 calculates a fitness c of the image processing program included in the population 11 by using the learning data which is reduced in resolution has been reduced in step S66. Also in this case, in a case where there are a plurality of pieces of learning data with lower resolution, the fitness c is calculated by using each learning data which is reduced in resolution.

Next, in step S70, the learning control unit 121 calculates an error (error average) d between the fitness C and the fitness c. In a case where there a plurality of pieces of learning data, a difference between the fitness C calculated by using first learning data and the fitness calculated by using the first learning data which is reduced in resolution, a difference between the fitness C calculated by using second learning data and the fitness calculated by using the second learning data which is reduced in resolution, and so on, and an average of the plurality of differences is defined as an error average d.

Next, in step S72, it is determined whether or not d is larger than σ. In a case where the determination in step S72 is negative, the process proceeds to step S74, and the learning control unit 121 sets the reduction ratio s as a current value of the variable B. Next, in step S76, the learning control unit 121 reduces the variable B by 0.1 and returns to step S66. In a case where the process returns to step S66, the processing after step S66 is executed by using the newly set variable B. Then, when the determination in step S72 is positive, the entire processing in FIG. 6 (all processing in step S11) is ended.

In a case where the processing of FIG. 6 is ended, the reduction ratio s is the value of B immediately before the error average d becomes larger than a (see step S74).

As described above, in the second embodiment, it is possible to automatically determine an appropriate value as the reduction ratio s by executing the processing of step S11 (the processing of FIG. 6). The initial value of the above-described variable B=0.9 or a value of 0.1 for subtracting the value of B in step S76 is an example. Therefore, other values may be set as each value.

In the second embodiment, in step S22' of FIG. 5A, the individuals whose fitness is the top n % are specified, and in step S40', the child individuals whose fitness is the top m % are specified. As described above, when specifying individuals or child individuals to be used for calculation of a fitness value using learning data, appropriate processing may be performed regardless of the number of individuals included in the population by specifying a predetermined percentage of individuals and child individuals.

The processing of step S11 of the second embodiment may be performed between the processing of step S10 and step S12 of FIG. 4 described in the first embodiment.

The above processing function may be realized by a computer. In that case, a program which describes the processing content of the function that the processing apparatus is supposed to have is provided. The above processing function is realized on the computer by executing the program on the computer. The program which describes the processing content may be recorded on a computer readable recording medium (except for a carrier wave).

In the case of distributing the program, for example, the program is sold in the form of a portable recording medium such as a digital versatile disc (DVD) or a compact disc read only memory (CD-ROM) on which the program is recorded. Alternatively, the program may be stored in the storage device of a server computer, and the program may be transferred from the server computer to another computer via a network.

The computer executing the program stores, for example, the program recorded on the portable recording medium or the program transferred from the server computer in the own storage device. Then, the computer reads the program from the storage device of the computer and executes processing in accordance with the program. The computer may also read the program directly from the portable storage medium and execute processing in accordance with the program. The computer may also execute processing in accordance with the received program each time the program is transferred from the server computer.

The embodiments described above are examples of preferred implementations of the disclosure. However, the embodiments are not limited thereto, and various modifications may be made without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory, the processor being configured to:
   execute generation processing that includes generating a plurality of first image processing programs as candidates for a second image processing program, wherein each of the plurality of first image processing programs has a tree structure with nodes incorporating filters and is for processing images captured by an imaging apparatus, and the second image processing program is a next generation image processing program in genetic programming and is for processing images captured by the imaging apparatus,
   execute first evaluation processing that includes
      obtaining low-resolution learning data generated from learning data, the low-resolution learning data including a low-resolution input image and a low-resolution target image, the low-resolution input image being generated by reducing resolution of an input image included in the learning data, the low-resolution target image being generated by reducing resolution of a target image included in the leaning data,
      obtaining output data from each first image processing program by inputting the low-resolution input image of the low-resolution learning data to the each first image processing program, and
      evaluating fitness for each first image processing program by calculating a similarity between the obtained output data from the each first image processing program and the low-resolution target image of the low-resolution learning data, the obtained output data being data obtained by the inputting of the low-resolution input image of the low-resolution learning data to the each first image processing program;
   execute second evaluation processing that includes
      narrowing down the candidates based on an evaluation result of the evaluating fitness in the first evaluation processing, and
      evaluating fitness of the narrowed-down candidates by using output data obtained by inputting the learning data to each of the narrowed-down candidates; and
   execute determination processing that includes determining the second image processing program based on an evaluation result of the evaluating fitness in the second evaluation processing.

2. The information processing apparatus according to claim 1,
   wherein the first evaluation processing adjusts, when evaluating fitness of a candidate, parameters of an image processing filter included in the first image processing program that is the candidate, in accordance with a reduction ratio of the learning data.

3. The information processing apparatus according to claim 1,
   wherein the narrowing down the candidates in the second evaluation processing narrows down the candidates to a predetermined percentage of candidates or a predetermined number of candidates whose fitness evaluated by the evaluating fitness in the first evaluation processing is high.

4. The information processing apparatus according to claim 1,
   wherein the processor is further configured to
      execute creation processing that includes creating the low-resolution learning data, and
   wherein the creation processing
      repeats resolution reduction of the learning data and evaluation of fitness of each of the first image processing programs using the learning data which is reduced in resolution while gradually changing a value of a reduction ratio, and
      determines the reduction ratio to be used when creating the low-resolution learning data based on fitness obtained as a result of the repeating of the resolution reduction.

5. A method comprising:
   executing generation processing that includes generating a plurality of first image processing programs as candidates for a second image processing program, wherein each of the plurality of first image processing programs has a tree structure with nodes incorporating filters and is for processing images captured by an imaging apparatus, and the second imaging processing program is a next generation image processing program in genetic programming and is for processing images captured by the imaging apparatus;
   executing first evaluation processing that includes
      obtaining low-resolution learning data generated from learning data, the low-resolution learning data including a low-resolution input image and a low-resolution target image, the low-resolution input image being generated by reducing resolution of an input image included in the learning data, the low-resolution target image being generated by reducing resolution of a target image included in the leaning data,
      obtaining output data from each first image processing program by inputting the low-resolution input image of the low-resolution learning data to the each first image processing program, and
      evaluating fitness for each first image processing program by calculating a similarity between the obtained output data from the each first image processing program and the low-resolution target image of the low-resolution learning data, the obtained output data being data obtained by the inputting of the low-resolution input image of the low-resolution learning data to the each first image processing program;

executing second evaluation processing that includes
- narrowing down the candidates based on an evaluation result of the evaluating fitness in the first evaluation processing, and
- evaluating fitness of the narrowed-down candidates by using output data obtained by inputting the learning data to each of the narrowed-down candidates; and executing determination processing that includes determining the second image processing program based on an evaluation result of the evaluating fitness in the second evaluation processing.

6. A non-transitory computer-readable storage medium for storing a program which causes a computer to perform processing, the processing comprising:

executing generation processing that includes generating a plurality of first image processing programs as candidates for a second image processing program, wherein each of the plurality of first image processing programs has a tree structure with nodes incorporating filters and is for processing images captured by an imaging apparatus, and the second image processing program is a next generation image processing program in genetic programming and is for processing images captured by the imaging apparatus, executing first evaluation processing that includes
- obtaining low-resolution learning data generated from learning data, the low-resolution learning data including a low-resolution input image and a low-resolution target image, the low-resolution input image being generated by reducing resolution of an input image included in the learning data, the low-resolution target image being generated by reducing resolution of a target image included in the leaning data,
- obtaining output data from for each first image processing program by inputting the low-resolution input image of the low-resolution learning data to the each first image processing program, and
- evaluating fitness for each first image processing program by calculating a similarity between the obtained output data from the each first image processing program and the low-resolution target image of the low-resolution learning data, the obtained output data being data obtained by the inputting of the low-resolution input image of the low-resolution learning data to the each first image processing program;

executing second evaluation processing that includes
- narrowing down the candidates based on an evaluation result of the evaluating in the first evaluation processing, and
- evaluating fitness of the narrowed-down candidates by using output data obtained by inputting the learning data to each of the narrowed-down candidates; and executing determination processing that includes determining the second image processing program based on an evaluation result of the evaluating fitness in the second evaluation processing.

* * * * *